(12) United States Patent
Harima et al.

(10) Patent No.: US 7,182,382 B2
(45) Date of Patent: Feb. 27, 2007

(54) RESIN-MADE FLOOR PANEL STRUCTURE

(75) Inventors: Issei Harima, Higashihiroshima (JP); Yoshihiro Takemoto, Higashihiroshima (JP); Takanobu Kamura, Aki-gun (JP); Chie Fukuhara, Aki-gun (JP); Takahiro Tochioka, Aki-gun (JP); Mitsuharu Kaneko, Aki-gun (JP); Shinya Nakamura, Aki-gun (JP); Fumiya Mouri, Aki-gun (JP)

(73) Assignees: G P Daikyo Corporation, Hiroshima (JP); Mazda Motor Corporation, Hiroshima (JP)

( * ) Notice: Subject to any disclaimer, the term of this patent is extended or adjusted under 35 U.S.C. 154(b) by 98 days.

(21) Appl. No.: 10/829,394

(22) Filed: Apr. 22, 2004

(65) Prior Publication Data

US 2004/0262935 A1    Dec. 30, 2004

(30) Foreign Application Priority Data

Apr. 24, 2003    (JP)    .................... 2003-120243

(51) Int. Cl.
*B62D 43/00*    (2006.01)
(52) U.S. Cl. .................... 296/37.2; 296/37.14
(58) Field of Classification Search ............. 296/37.2, 296/37.3, 37.14, 193.07; 224/42.12, 42.13, 224/42.14, 42.2, 42.24, 539, 541, 542
See application file for complete search history.

(56) References Cited

U.S. PATENT DOCUMENTS

| | | | | |
|---|---|---|---|---|
| 4,830,241 A | * | 5/1989 | Ulmer et al. ............... 224/42.2 |
| 5,178,434 A | * | 1/1993 | Krebs ......................... 296/37.3 |
| 5,797,642 A | * | 8/1998 | Takanishi et al. ........... 296/37.3 |
| 5,799,845 A | * | 9/1998 | Matsushita ................ 224/42.14 |
| 5,979,962 A | | 11/1999 | Valentin et al. |
| 6,003,921 A | * | 12/1999 | Tozuka ...................... 296/37.2 |
| 6,102,464 A | | 8/2000 | Schneider et al. |
| 6,145,907 A | * | 11/2000 | Maruyama et al. ...... 296/37.14 |
| 6,290,278 B1 | * | 9/2001 | Loveland .................... 296/39.1 |
| 6,439,633 B2 | * | 8/2002 | Nemoto .................... 296/37.14 |
| 6,481,773 B1 | * | 11/2002 | Salani et al. ............. 296/37.16 |
| 6,793,261 B2 | * | 9/2004 | McLeod et al. ........... 296/37.2 |
| 2002/0185881 A1 | * | 12/2002 | Kosuge et al. ............. 296/37.2 |

FOREIGN PATENT DOCUMENTS

| | | |
|---|---|---|
| DE | 3035644 A1 | 5/1982 |
| EP | 0 270 097 A1 | 6/1988 |
| EP | 1 084 942 A1 | 3/2001 |
| FR | 2 687 629 | 8/1993 |
| JP | 2001-10542 | 1/2001 |
| JP | 2001-010542 A | 1/2001 |

* cited by examiner

*Primary Examiner*—Lori L. Coletta
(74) *Attorney, Agent, or Firm*—Nixon Peabody LLP; Donald R. Studebaker

(57) ABSTRACT

The resin-made floor panel structure including a trunk floor F1 made of resin integrally forming a spare tire storage space S1, and a trunk board B1 made of resin disposed so as to cover the floor panel, fitting parts Sw1, Bk1 for achieving the closure of the spare tire storage space are integrally formed respectively in the trunk floor and trunk board. Thereby, in using resin materials for a floor panel, transmission of noise in the floor section to the compartment side can be suppressed by a relatively simple structure without increasing the weight.

5 Claims, 9 Drawing Sheets

RESIN-MADE FLOOR PANEL STRUCTURE

BACKGROUND OF THE INVENTION

1. Field of the Invention

The present invention relates to a resin-made floor panel structure applied to a floor of vehicle such as automobile.

2. Description of the Related Art

As is well known, conventionally, the floors of vehicles such as automobiles have been constituted by using floor panels made of steel.

Recently, however, for a higher fuel cost efficiency, for example, the car body is expected to reduce in weight progressively. And, in order to meet such need, it is attempted to reduce the weight of the vehicle floor by using a floor panel made of resin. For example, Japanese Patent Laid-open Publication No. 2001-10542 discloses a manufacturing method of automobile floor by expansion molding.

By using a resin-made floor panel instead of steel plate structure, the weight of the vehicle floor is reduced, but the strength and rigidity are lowered at the same time, and further due to weight reduction of panel itself, the resonance point becomes higher, and problems of vibration and noise in the floor section become more serious, as a result silent compartment is disturbed.

To solve such problems, it may be considered to increase the thickness of the resin floor panel, but if the thickness is increased too much, the weight and the manufacturing cost are increased, and the merit of using resin for floor panel may be lost.

When absorbing sound in a space, it is known that the sound energy density is higher as the space volume is smaller, and that the sound can be absorbed and attenuated more effectively. It is more advantageous when the air tightness of the space is higher. Therefore, to suppress transmission of floor section noise to the compartment side, it is important to absorb sound or isolate sound in a space of small volume and high degree of air tightness.

SUMMARY OF THE INVENTION

It is hence a basic object of the invention to suppress transmission of noise generated in the floor section to the compartment side, without increasing the weight, in a relatively simple structure, by enhancing the degree of air tightness of the specific space of the floor section, in a case of using a resin-made floor panel.

Therefore, in accordance with a first aspect of the present invention, there is provided a resin-made floor panel structure applied in a vehicle floor including: a floor panel made of resin integrally forming a spare tire storage space, and a trunk board made of resin disposed so as to cover the floor panel, wherein fitting parts are integrally formed in the floor panel and trunk board respectively so as to achieve the closure of the spare tire storage space.

According to the first aspect of the present invention, the tight closure of the spare tire storage space is achieved by mutually fitting the fitting parts integrally formed in the floor panel and trunk board. As a result, transmission of sound from the spare tire storage space to outside (in particular, to the compartment side) can be suppressed. That is, by using resin materials for the floor panel, the weight is reduced, and noise in the spare tire storage space can be controlled in a simple structure.

In one embodiment of the first aspect of the present invention, preferably, the trunk board has an engaging part for achieving the air tightness against the car body side wall.

In this case, in particular, the trunk board has an engaging part for achieving the air tightness against the car body side wall, and therefore also the air tightness against the car body side wall can be obtained when mounting the trunk board. That is, the air tightness is obtained in the space formed between the trunk board and floor panel, and transmission of sound from this space to the compartment side can be suppressed.

Further, in one embodiment of the first aspect of the present invention, preferably, the trunk board includes a first board part covering the spare tire storage space, a second board part having the engaging part and covering the portion excluding the spare tire storage space of the floor panel, and a hinge part rotatably coupling the second board part and first board part, and the hinge part is composed of a sound insulating flexible member, and is fixed between the both board parts without allowing gap.

In this case, in particular, the trunk board includes a first board part and a second board part, and the both are rotatably coupled by means of a hinge, and therefore the trunk board is easier to use as compared with a single-piece structure. Moreover, the hinge part is composed of a sound insulating flexible member, and is fixed between the both board parts without allowing gap, so that the sound insulation of the trunk board is assured.

Furthermore, in one embodiment of the first aspect of the present invention, preferably, a tapered fitting part expanding upward is formed in the peripheral wall of the spare tire storage part, and the fitting part of the trunk board has a taper to be engaged with the tapered fitting part.

In this case, in particular, a tapered fitting part expanding upward is formed in the peripheral wall of the spare tire storage part, and the fitting part of the trunk board has a taper to be engaged with the tapered fitting part, and therefore by making use of so-called taper fitting, a higher degree of closure is obtained in the spare tire storage space.

Furthermore, in one embodiment of the first aspect of the present invention, preferably, a concave commodity pocket formed along the taper of the fitting part is provided at the upper side of the fitting part of the trunk board.

In this case, in particular, a concave commodity pocket formed along the taper of the fitting part is provided at the upper side of the fitting part of the trunk board, and therefore the commodity pocket can be formed in a simple structure without requiring any extra member.

Furthermore, in one embodiment of the first aspect of the present invention, preferably, a grooved fitting part is formed at the outer side of the peripheral edge of the spare tire storage part, and the fitting part of the trunk board is formed in a convex shape to be combined with the grooved fitting part.

In this case, in particular, a grooved fitting part is formed at the outer side of the peripheral wall of the spare tire storage part, and the fitting part of the trunk board is formed in a convex shape to be combined with the grooved fitting part, and therefore the spare tire storage space can be closed tightly in a simple structure.

In accordance with a second aspect of the present invention, there is provided a resin-made floor panel structure applied in a vehicle floor including: a floor panel made of resin integrally forming a spare tire storage space, and a trunk board made of resin disposed so as to cover the floor panel, wherein a sealing part is provided between the floor panel and trunk board so as to achieve the closure of the spare tire storage space.

According to the second aspect of the present invention, a sealing part is provided between the floor panel and trunk board so as to achieve the tight closure of the spare tire storage space, and the closure of the space formed between the trunk board and floor panel is achieved. Thereby, transmission of sound from this space to outside (in particular, to the compartment side) can be suppressed. That is, by using resin materials for the floor panel, the weight is reduced, and noise can be controlled in a simple structure.

In one embodiment of the second aspect of the present invention, preferably, a protrusion is formed at least one of the floor panel and the trunk board so as to project to the other side surrounding the spare tire storage space, and a seal member is provided at the leading end of the protrusion, thereby forming the sealing part.

In this case, in particular, a protrusion is formed at least one of the floor panel and the trunk board so as to project to the other side surrounding the spare tire storage space, and a seal member is provided at the leading end of the protrusion, thereby forming the sealing part. Therefore, the sealing surface pressure at the sealing part is heightened, and the closure of the space can be enhanced.

Further, in one embodiment of the second aspect of the present invention, preferably, a groove surrounding the spare tire storage space is formed at least one of the floor panel and the trunk board, and an abutting face abutting against the seal member is provided at the outer side and/or inner side of the groove, thereby forming the sealing part.

In this case, in particular, a groove surrounding the spare tire storage space is formed at least one of the floor panel and the trunk board, and an abutting face abutting against the seal member is provided at the outer side and/or inner side of the groove, thereby forming the sealing part. Therefore, when fixing the trunk board on the floor panel, the groove is filled with an adhesive to close tightly and fix securely, or when the trunk board is used as a detachable member from the floor panel, the seal member abuts against the abutting surface, so that the tight closure of the two when mounting the trunk board is assured.

In accordance with a third aspect of the present invention, there is provided a resin-made floor panel structure applied in a vehicle floor including: a floor panel made of resin, and a trunk board made of resin disposed so as to cover the floor panel, wherein engaging parts are integrally formed in the trunk board and the car body side wall respectively so as to achieve the closure of the space between the trunk board and floor panel.

According to the third aspect of the present invention, engaging parts are integrally formed in the trunk board and the car body side wall respectively so as to achieve the closure of the space between the trunk board and floor panel, and therefore the tight closure of the space is achieved by mutually fitting the integrally formed fitting parts. As a result, transmission of sound from this space to the compartment side can be suppressed. That is, by using resin materials for the floor panel, the weight is reduced, and noise in the floor section can be controlled in a simple structure.

In accordance with a fourth aspect of the present invention, there is provided a resin-made floor panel structure applied in a vehicle floor including: a floor panel made of resin, and a trunk board made of resin being disposed so as to cover the floor panel, wherein a protrusion is formed integrally in at least one of the floor panel and the trunk board so as to project into the space between the two and increase the surface area of the sound absorbing part facing the space.

According to the fourth aspect of the present invention, a protrusion is formed integrally in at least one of the floor panel and the trunk board so as to project into the space between the two and increase the surface area of the sound absorbing part facing the space, and therefore the sound absorbing performance by the floor panel and/or trunk board is enhanced, and the sound in the space can be absorbed more effectively. That is, by using resin materials for the floor panel, the weight is reduced, and noise can be controlled in a simple structure.

In one embodiment of the fourth aspect of the present invention, preferably, a storage space is integrally formed in the floor panel, at least the peripheral wall of the storage space forms a sound absorbing part, and the peripheral wall is formed in a taper expanding upward.

In this case, in particular, a storage space is integrally formed in the floor panel, at least the peripheral wall of the storage space forms a sound absorbing part, and the peripheral wall is formed in a taper expanding upward, and thereby, the area of the sound absorbing part (peripheral wall) of the floor panel is increased, and the sound absorbing performance is enhanced.

Further, in one embodiment of the fourth aspect of the present invention, preferably, the trunk board includes a protrusion projecting into the space against the spare tire storage space and having a sound absorbing part on the surface, and at least part of the protrusion forms a fitting part to be fitted to the tapered peripheral wall of the spare tire storage space.

In this case, in particular, the trunk board includes a protrusion projecting into the space against the spare tire storage space and having a sound absorbing part on the surface, and at least part of the protrusion forms a fitting part to be fitted to the tapered peripheral wall of the spare tire storage space. Thereby, a high degree of closure of the spare tire storage space can be achieved by making use of the so-called taper fitting, and in this closed state, by the sound absorbing parts of the protrusion and tapered peripheral wall, the noise in the spare tire storage space can be effectively absorbed.

In accordance with a fifth aspect of the present invention, there is provided a resin-made floor panel structure applied in a vehicle floor including: a floor panel made of resin integrally forming a plurality of storage spaces including a spare tire storage space, and a trunk board made of resin disposed so as to cover the floor panel, wherein the plurality of storage spaces and/or walls formed among the storage spaces are set in mutually different dimensions.

According to the fifth aspect of the present invention, the plurality of storage spaces provided on the floor panel and/or walls formed among the storage spaces are set in mutually different dimensions, and thereby resonance of sound in specific frequency band possible to occur when the dimensions are matched can be effectively prevented. That is, by using resin materials for the floor panel, the weight is reduced, and noise due to resonance can be suppressed in a simple structure.

In accordance with a sixth aspect of the present invention, there is provided a resin-made floor panel structure applied in a vehicle floor including: a floor panel made of resin, and a trunk board made of resin disposed so as to cover the floor panel, wherein a plurality of protrusions are formed in at least one of the floor panel and trunk board so as to project into the space between the two, and these protrusions are set so as to be mutually different in dimensions and set in dimensions and shapes depending on the frequency band of the object of attenuation.

According to the sixth aspect of the present invention, a plurality of protrusions are formed in at least one of the floor panel and trunk board so as to project into the space between the two, and these protrusions are set in dimensions and shapes depending on the frequency band of the object of attenuation, and therefore noise in a specific frequency band can be attenuated effectively. In this case, since the plurality of protrusions are set in mutually different dimensions, resonance of sound is avoided. That is, by using resin materials for the floor panel, the weight is reduced, and noise can be controlled in a simple structure.

In one embodiment of the sixth aspect of the present invention, preferably, the dimensions of the plurality of protrusions of the trunk board are set smaller than the dimensions of the plurality of protrusions of the floor panel, the plurality of protrusions of the trunk board are set in dimensions and shapes depending on the relatively high frequency band of object of attenuation, and the plurality of protrusions of the floor panel are set in dimensions and shapes depending on the relatively low frequency band of object of attenuation.

In this case, in particular, the dimensions of the plurality of protrusions of the trunk board are set smaller than the dimensions of the plurality of protrusions of the floor panel, the plurality of protrusions of the trunk board are set in dimensions and shapes depending on the relatively high frequency band of object of attenuation, and the plurality of protrusions of the floor panel are set in dimensions and shapes depending on the relatively low frequency band of object of attenuation. Therefore, together with the trunk board side and floor panel side, noise can be attenuated effectively in a wider frequency band.

DETAILED DESCRIPTION OF THE INVENTION

A preferred embodiment of the invention is described below by referring to the accompanying drawings. The embodiment is to explain the present invention with an example in which it is applied to a floor panel structure of trunk disposed in a rear part of a car body of vehicle such as automobile, specifically.

Figure 1:
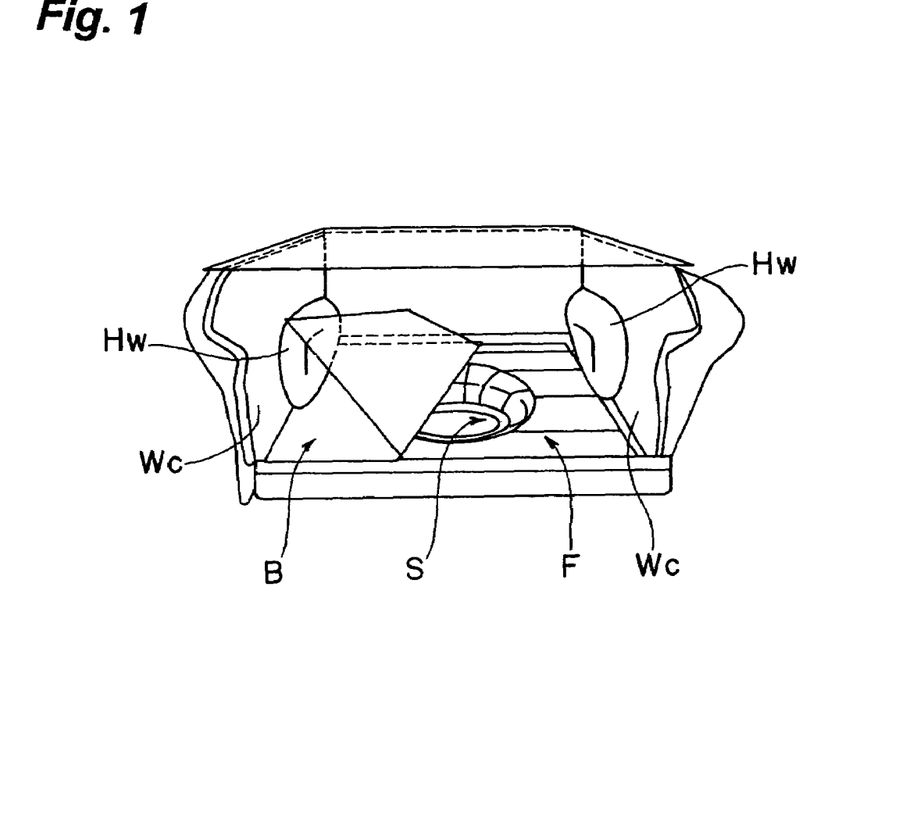
FIG. 1 is a schematic explanatory drawing of trunk of automobile in a preferred embodiment of the invention seen from behind the car body.
Figure 2:
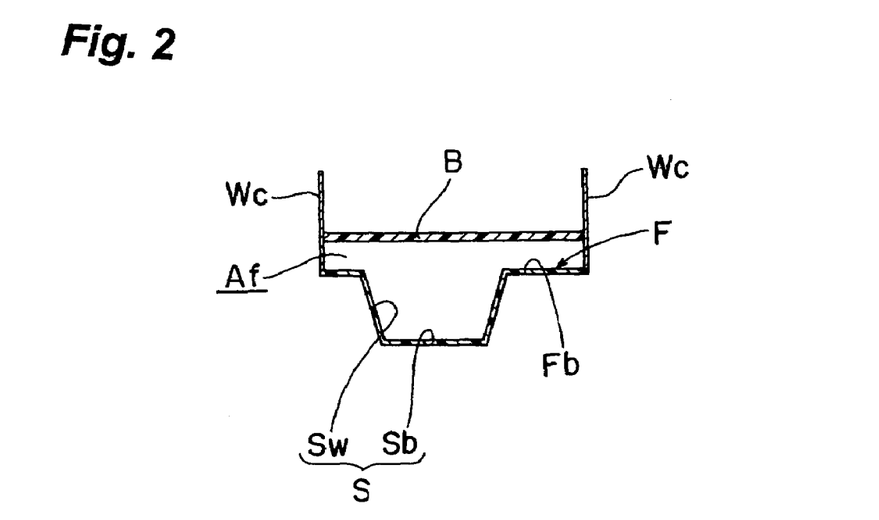
FIG. 2 is a sectional explanatory drawing schematically showing a basic configuration of floor structure of the trunk.

FIG. 1 is a schematic explanatory drawing of trunk of automobile seen from behind the car body in a preferred embodiment of the invention. FIG. 2 is a sectional explanatory drawing schematically showing a basic configuration of floor structure of the trunk.

As shown in the drawings, the trunk has a concave spare tire storage space S for accommodating a spare tire (not shown). The spare tire storage space S is formed in a floor panel F (trunk floor) constituting the floor. The trunk floor F is a one-body structure of synthetic resin material instead of a conventional steel plate structure.

Although not shown specifically in the drawings, both ends in the car width direction of the trunk floor F are supported by a pair of right and left frame members (rear side frames) extending in the longitudinal direction in the rear part of the car body. Front and rear ends of the trunk floor F are supported by a front frame and a rear end frame extending in the car width direction, respectively.

Above the trunk floor F, a trunk board B is disposed so as to cover the entire trunk floor F substantially. This trunk board B is also formed into one-body structure by using synthetic resin material.

In a relatively front side portion of right and left side walls Wc of the car body in the trunk, a pair of right and left wheel houses Hw are formed to cover the upper part of the right and left rear wheels (not shown).

The right and left side portions of the trunk board B preferably contact air-tightly with the right and left side walls Wc of the car body. Thereby, the air tightness of the space Af formed between the trunk board B and trunk floor F is heightened, and the noise such as road noise and tire noise from beneath the floor is absorbed as much as possible in the space Af, so that transmission of the noise to the compartment side is suppressed.

As the synthetic resin material for the trunk floor F and trunk board B, for example, a fiber reinforced plastic (FRP) material based on polypropylene (PP) resin may be used. Other usable resin materials include nylon, ABS, PPO, PBT, and other resin materials blending reinforcing materials, and various known materials. Reinforcing materials are not limited to glass fiber, carbon fiber, or other fiber reinforcing materials, but also include talc, glass beads, and other reinforcing materials.

The spare tire storage space S of the trunk floor F is, as known from FIG. 2, formed of a bottom part Sb for mounting a spare tire, and a peripheral wall part Sw rising from the peripheral edge of the bottom part Sb to a base surface Fb forming a flat reference plane of the trunk floor F.

Figure 3:
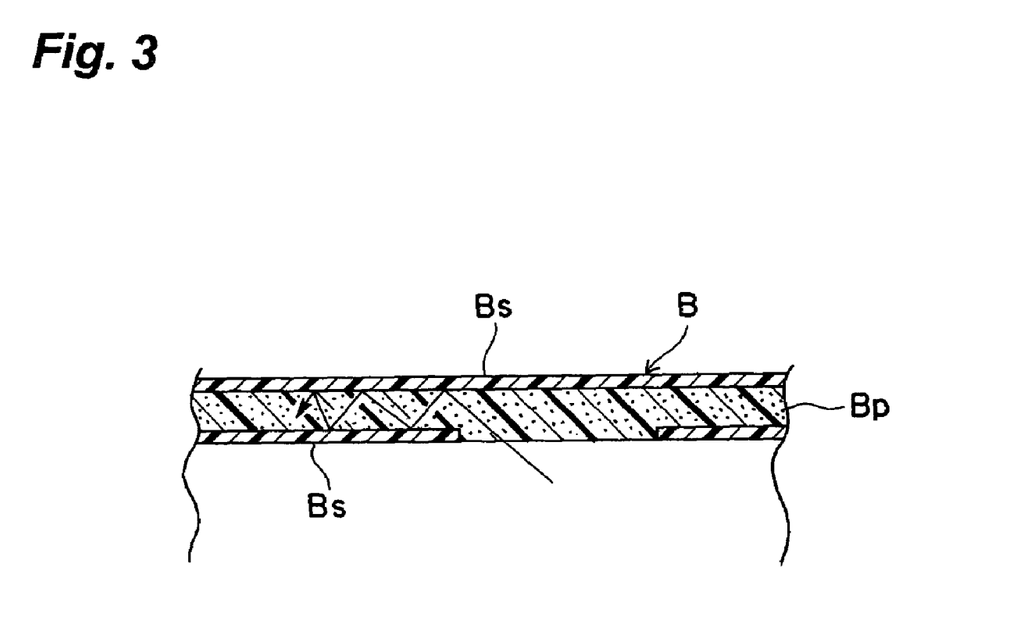
FIG. 3 is a sectional explanatory drawing schematically showing a sectional structure of trunk board of the trunk.

FIG. 3 is a sectional explanatory drawing schematically showing a sectional structure of the trunk board B.

As shown in the drawing, the trunk board B includes foamed layer Bp having multiple internal porous voids (foams), and skin layers Bs covering the upper and lower surface sides of the foamed layer Bp.

The foamed layer Bp can be obtained, for example, by adding foaming agent in the material resin, and foaming at the time of molding and forming the foamed layer. Instead of using foaming agent, other methods may be employed, such as gas injection method or critical foaming method.

The skin layer Bs is formed as resin surface layer in the portion contacting the molding surface of the molding die, and it is a so-called solid layer solidified without having porous voids due to foaming.

In the preferred embodiment, only on the lower side of the trunk board B (that is, the side facing the trunk floor F), at least part of the surface layer Bs is removed, and the porous foams are exposed in this part.

Noise transmitted from beneath the trunk board B to the compartment side gets into the foamed layer Bp from the removed part of the solid skin layer Bs, and part of energy is directly absorbed by the porous foams Bp, so that the sound is absorbed very effectively.

If the entire surface is covered with the skin layer Bs without having exposed part of the foams Bp, noise transmitted from beneath the trunk board B to the compartment side may be partly absorbed when passing through the foamed layer Bp, but when at least part of the skin layer Bs is removed and at least part of the foamed layer Bp is exposed, sound propagation energy is directly absorbed in the foamed layer Bp, and a higher sound absorbing effect is obtained.

At least part of the skin layer Bs can be removed by various methods, and, for example, after forming the trunk board B, part of the skin layer Bs can be removed mechanically by using a cutting tool or the like, and the foams Bp can be exposed in this part.

Thus, by disposing the foamed layer Bp with exposed foams at least in part only on the side of the trunk board B facing the trunk floor F, the noise in the space Af between the trunk floor F and trunk board B can be effectively absorbed by the exposed foams Bp. That is, by using resin materials for the trunk floor F, the weight is reduced, and the noise level can be also lowered by a relatively low cost.

In this case, the sound absorbing effect can be enhanced without causing adverse effects on the strength, rigidity or appearance of the trunk floor F supporting a spare tire which is a heavy object. Since the exposed foams are provided only on the side of the trunk board B facing the trunk floor F, the compartment side of the trunk board B is free from adverse effects such as deposit of dust particles on the exposed part to impair the appearance.

In particular, in the foamed layer Bp with exposed foams, since the foams are exposed only partly, lowering of strength and rigidity of the trunk board B having such foamed layer can be suppressed. That is, both assurance of strength and rigidity of the trunk board B and enhancement of sound absorbing performance can be established.

In this case, meanwhile, in the foamed layer Bp with partly exposed foams, more preferably, portions of exposed foams and portions of foams covered with the skin layer Bs are properly combined, and it can be set to attenuate effectively the noise in specific frequency band, for example, noise in particularly irritating specific frequency band. That is, by combining depending on the frequency band determined as the object of attenuation, noise in particularly irritating specific frequency band can be attenuated effectively.

Figure 4:
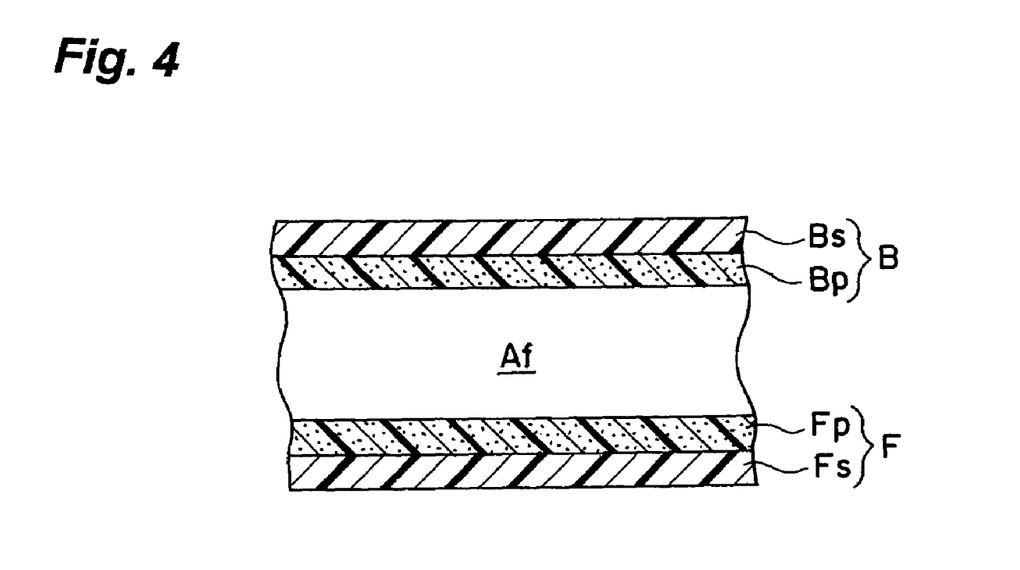
FIG. 4 is a sectional explanatory drawing schematically showing an example of combined state of trunk board and trunk floor.

FIG. 4 is a sectional explanatory drawing schematically showing an example of combined state of trunk board B and trunk floor F.

In this example, on both side of the trunk board B facing the trunk floor F (lower side) and side of the trunk floor F facing the trunk board B (upper side), the skin layers Bs, Fs are entirely removed, and the foamed layers Bp, Fp are entirely exposed. Therefore, the noise in the space Af formed between the two is very effectively absorbed, and transmission to the compartment side is suppressed.

Alternatively, on the side of the trunk floor F facing the trunk board B (upper side), the foamed layer Fp with foams exposed at least in part (entire surface in the example in FIG. 4) may be provided. In this case, by the foams exposed in the space Af formed between the floor panel F and trunk board B, the noise in the space Af can be more effectively absorbed. In particular, in this case, the sound absorbing effect can be enhanced without causing adverse effects on the strength, rigidity or appearance of the trunk board B.

When absorbing sound in a space, the sound energy density is higher as the space volume is smaller, so that the sound can be absorbed and attenuated more effectively. It is more advantageous when the air tightness of the space is higher.

Therefore, by closing the spare tire storage space S formed in the trunk floor F by the trunk board B, for example, the noise in the spare tire storage space S of relatively small space volume (as compared with the space Af) can be absorbed effectively.

The following explanation relates to exemplary embodiments of structure for closing the space formed between the floor panel and trunk board, or the spare tire storage space minimizing this space.

In the following explanations, the same parts as in the preferred embodiments described in FIG. 1 to FIG. 4 are identified with same reference numerals, and further explanation is omitted.

Figure 5:
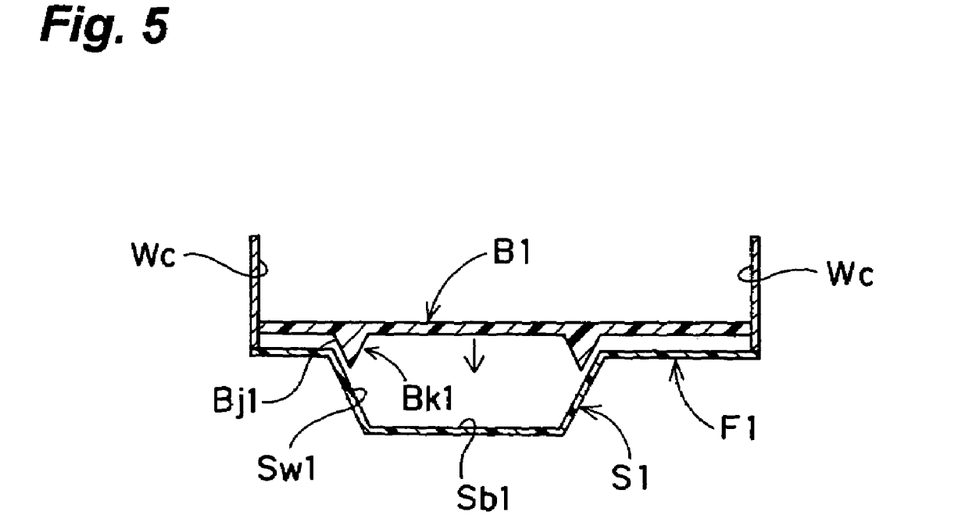
FIG. 5 is a sectional explanatory drawing schematically showing a closed structure of trunk floor and trunk board in a first exemplary embodiment.

FIG. 5 is a sectional explanatory drawing schematically showing a closed structure of trunk floor and trunk board in a first exemplary embodiment. In this first exemplary embodiment, a spare tire storage space S1 is closed by a trunk board B1.

In the first exemplary embodiment, an annular protrusion Bk1 projecting to the side of the spare tire storage space S1 is provided in the trunk board B1. The protrusion Bk1 is formed in a nearly triangular sectional shape.

The lower side of the trunk board B1 at least enclosed by the protrusion Bk1 (the side of the trunk board B1 facing the spare tire storage space S1 in the trunk floor F1) preferably composes a sound absorbing part having a foamed layer Fp with foams exposed at least in part.

More preferably, the inside slope of the protrusion Bk1 similarly composes a sound absorbing part. That is, by forming the protrusion Bk1, the surface area of the sound absorbing part facing the space to be closed (the spare tire storage space S1) can be increased.

Thus, since the protrusion Bk1 projecting into the spare tire storage space S1 and increasing the surface area of the sound absorbing part facing the space in the storage space S1 is integrally formed in the trunk board B1, the sound absorbing effect by the trunk board B1 is enhanced, and the noise in the spare tire storage space S1 can be absorbed effectively. Thus, the noise can be controlled by a simple structure.

The peripheral wall Sw1 of the spare tire storage space S1 is formed in a taper expanding upward, and this peripheral wall Sw1 forms the sound absorbing part. At least part of the bottom Sb1 may be formed to compose a sound absorbing part.

Since at least the peripheral wall Sw1 of the spare tire storage space S1 composes the sound absorbing part, and this peripheral wall Sw1 is formed in a taper expanding upward, as compared with the peripheral wall formed nearly vertically, the area of the sound absorbing part (peripheral wall Sw1) of the spare tire storage space S1 can be increased, and the sound absorbing effect by the peripheral wall Sw1 can be enhanced.

The slope Bj1 (taper) of the protrusion Bk1 provided in the trunk board B1 is set in the position and angle so as to be combined with the taper of the peripheral wall Sw1, and a fitting part is formed for achieving the tight closure of the spare tire storage part S1 together with the taper of the peripheral wall Sw1.

That is, when the taper Bj1 of the protrusion Bk1 is fitted to the inside of the taper peripheral wall Sw1 of the spare tire storage space S1, the spare tire storage space S1 is closed tightly by the trunk board B1.

Meanwhile, both the taper Bj1 of the protrusion Bk1 and the taper of the peripheral wall Sw1 are preferred to be covered entire with the skin layers Bs, Fs, without exposing the foams on the surface, in the mutually fitting parts.

Thus, according to the first exemplary embodiment, by mutually fitting the fitting parts integrally formed in the trunk floor F1 and trunk board B1 respectively, the closure of the spare tire storage space S1 can be achieved. As a result, transmission of noise from the spare tire storage space S1 to the compartment side can be suppressed. That is, by using resin materials for the trunk floor F1, the weight is reduced, and the noise in the spare tire storage space S1 can be controlled by a simple structure.

In particular, by forming a tapered fitting part expanding upward in the peripheral wall Sw1 of the spare tire storage space S1, and disposing a taper Bj1 to be combined with the tapered fitting part in the protrusion Bk1 of the trunk board B1, a higher closure of the spare tire storage space S1 is obtained by making use of the so-called taper fitting.

Also, in the trunk board B1, a protrusion Bk projecting into the space against the spare tire storage space S1 and having a sound absorbing part on the surface is formed, and at least part of the protrusion Bk1 composes a fitting part fitting to the tapered peripheral wall Sw1 of the spare tire storage space S1. Thereby, a higher closure of the spare tire storage space S1 is obtained by making use of the so-called taper fitting. Moreover, in this closed state, by the sound absorbing parts of the protrusion Bk, trunk board B1 and tapered peripheral wall Sw1, the sound in the spare tire storage space S1 can be effectively absorbed.

A second exemplary embodiment is described below.

Figure 6:
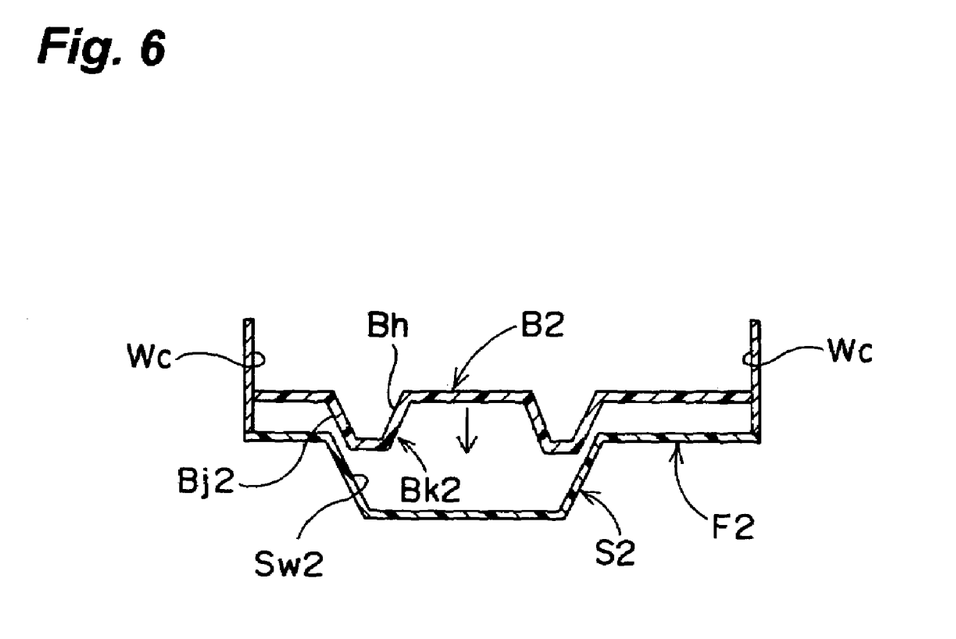
FIG. 6 is a sectional explanatory drawing schematically showing a closed structure of trunk floor and trunk board in a second exemplary embodiment.

FIG. 6 is a sectional explanatory drawing schematically showing a closed structure of trunk floor and trunk board in the second exemplary embodiment. In this second exemplary embodiment, too, a spare tire storage space S2 is closed by a trunk board B2.

The second exemplary embodiment is similar to the first exemplary embodiment in basic structure except that the shape of the fitting part Bk2 of the trunk board B2 is different.

Therefore, basically, the same function and effect as in the first exemplary embodiment are obtained.

In the second exemplary embodiment, an outside taper Bj2 of an annular protrusion Bk2 provided in the trunk board B2 is fitted to the inside of a tapered peripheral wall Sw2 of the spare tire storage space S2, so that the spare tire storage space S2 is closed tightly by the trunk board B2.

In this case, a recess Bh conforming to the taper of the protrusion Bk2 is formed at the upper side of the annular protrusion Bk2 provided in the trunk board B2, and this recess Bh can be used as a commodity pocket. Therefore, in a simple structure without requiring extra member, a commodity pocket Bh can be formed at the upper side of the trunk board B2.

Since the surface area of the protrusion Bk2 can be set wider than the protrusion Bk1 in the first exemplary embodiment, the sound absorbing part can be set in a wider area.

A third exemplary embodiment is described below.

Figure 7:
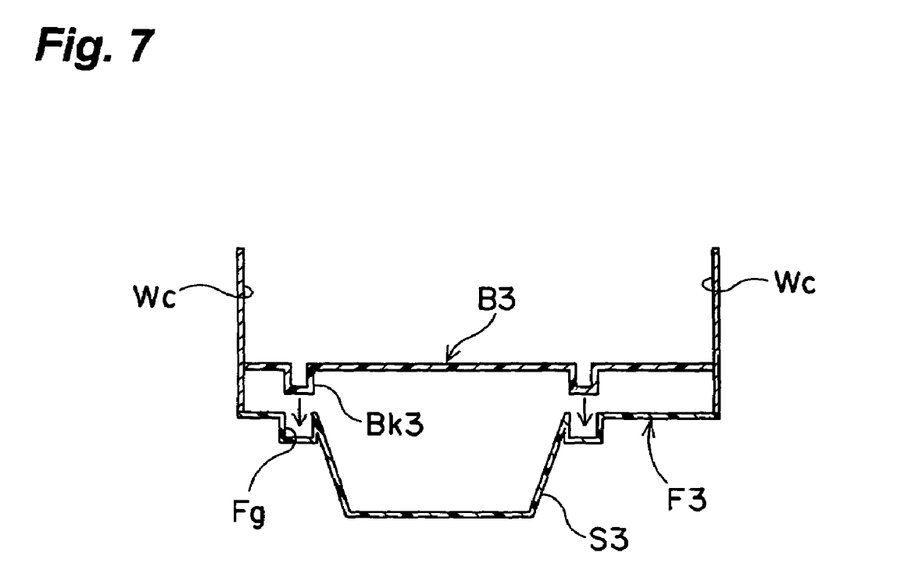
FIG. 7 is a sectional explanatory drawing schematically showing a closed structure of trunk floor and trunk board in a third exemplary embodiment.

FIG. 7 is a sectional explanatory drawing schematically showing a closed structure of trunk floor and trunk board in the third exemplary embodiment. In the third exemplary embodiment, too, a spare tire storage space S3 is closed by a trunk board B3.

In the third exemplary embodiment, a grooved fitting part Fg is formed at the outside of a peripheral edge of the spare tire storage space S3 of the trunk floor F3. A convex annular protrusion Bk3 to be combined with the grooved fitting part Fg is formed in the trunk board B3. This annular protrusion Bk3 is preferably fitted to the grooved fitting part Fg by a specified tightening allowance, and the closure of the spare tire storage space S3 is heightened. Instead, the fitting structure of the annular protrusion Bk3 and grooved fitting part Fg may be a so-called clearance fitting, and an adhesive may be applied between the two.

In this case, at least part of the fitting pars cannot be used as sound absorbing effect, but except for this effect, the same effect and function as in the first and second exemplary embodiments can be obtained. Moreover, by a very simple structure, the spare tire storage part S3 can be closed tightly.

A fourth exemplary embodiment is described below.

Figure 8:
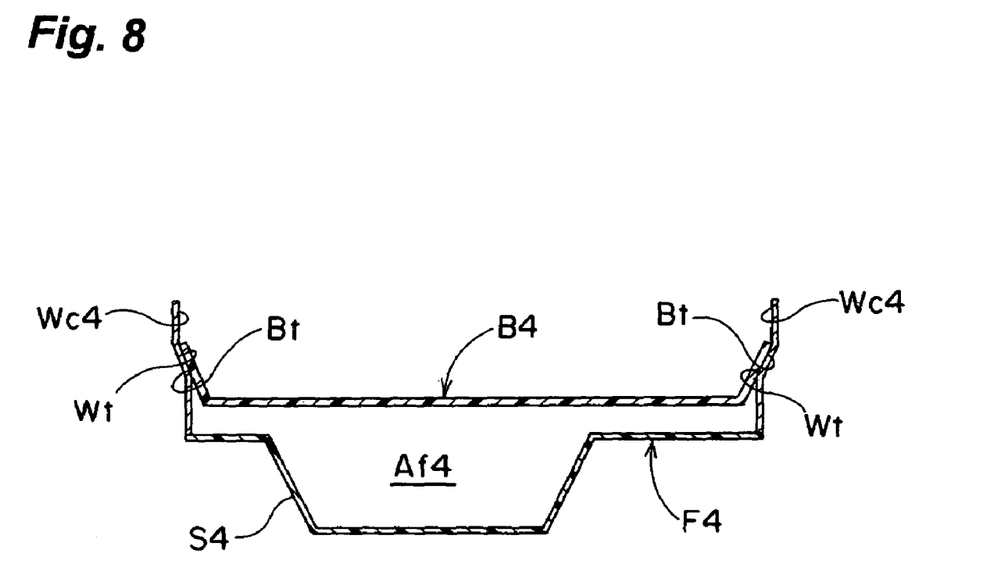
FIG. 8 is a sectional explanatory drawing schematically showing a closed structure of trunk floor and trunk board in a fourth exemplary embodiment.

FIG. 8 is a sectional explanatory drawing schematically showing a closed structure of trunk floor and trunk board in the fourth exemplary embodiment. In the fourth exemplary embodiment, a space Af4 formed between a trunk floor F4 and a trunk board B4 including a spare tire storage space S4 can be closed tightly.

In the fourth exemplary embodiment, at both ends in the car body widthwise direction of the trunk board B4, tapers Bt are formed integrally so as to rise upward obliquely at a specified angle. On the other hand, in the midst of a car body side wall Wc4, a sloped (tapered) receiving part Wt is formed integrally so as to be combined with the taper Bt.

By fitting the trunk board B4 from above so as to cover the trunk floor F4, the taper Bt of the trunk board B4 is combined and contacted with the tapered receiving part Wt of the car body side wall Wc4, and by taper engagement of the two, the space Af4 between the trunk floor F4 and trunk board B4 is closed tightly.

In this case, since the tapered engaging parts Wt, Bt are formed integrally in the trunk board B4 and car body side wall Wc4 respectively so as to achieve closure of the space Af4 between the trunk board B4 and trunk floor F4, by mutually engaging these engaging parts Wt, Bt, a secure closure of the space Af4 is achieved.

As a result, transmission of sound from the space Af4 between the trunk board B4 and trunk floor F4 to the compartment side can be suppressed. That is, by using resin materials for the trunk floor F4, the weight is reduced, and the noise in the floor section can be controlled by a simple structure.

A higher sound absorbing effect can be obtained by forming the sound absorbing part as mentioned above at the inner side of the trunk board B4 and/or trunk floor F4.

Such closed structure between the trunk board B4 and car body side wall Wc4 can be also applied in the first to third exemplary embodiments. In this case, by further forming engaging parts in the trunk board to achieve the air tightness against the car body side wall, the air tightness to the car body side wall can be also achieved when mounting the trunk board. That is, the tight closure of the space formed between the trunk board and trunk floor is obtained, and transmission of sound from this space to the compartment side can be suppressed.

A fifth exemplary embodiment is described below.

Figure 9:
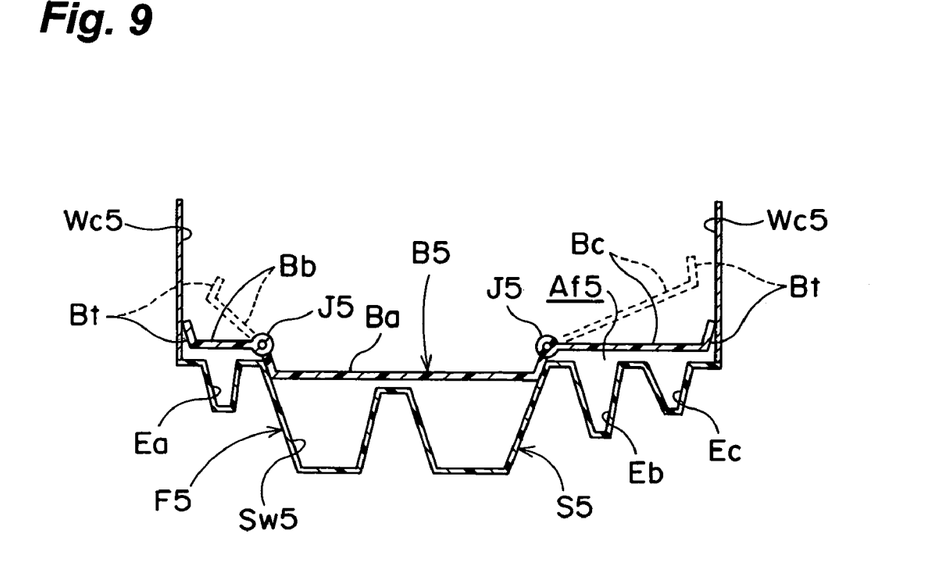
FIG. 9 is a sectional explanatory drawing schematically showing a closed structure of trunk floor and trunk board in a fifth exemplary embodiment.

FIG. 9 is a sectional explanatory drawing schematically showing a closed structure of trunk floor and trunk board in the fifth exemplary embodiment. In the fifth exemplary embodiment, a spare tire storage space S5 is closed, and a portion Af5 other than the spare tire storage space S5 can be also closed in the space formed between a trunk floor F5 and a trunk board B5.

In the fifth exemplary embodiment, the trunk board B5 is divided into a first board part Ba covering the spare tire storage space S5, and second board parts Bb, Bc covering the portion excluding the spare tire storage space S5 of the trunk floor F5. At side ends of the second board parts Bb, Bc, there are engaging parts Bt for engaging with the car body side wall Wc5 to close tightly. On the outer periphery of the first board part Ba, a taper is provided to be fitted to the tapered peripheral wall Sw5 of the spare tire storage space S5.

The trunk floor F5 also includes a plurality of commodity storage spaces Ea, Eb, Ec aside from the spare tire storage space S5, and when the trunk floor F5 is covered by the trunk board B5 from above, the spare tire storage space S5 is closed by the first board part Ba, and the commodity storage space Ea is covered with the left side second board part Bb, and small commodity storage spaces Eb, Ec are covered with the right side second board part Bc from above.

Figure 10:
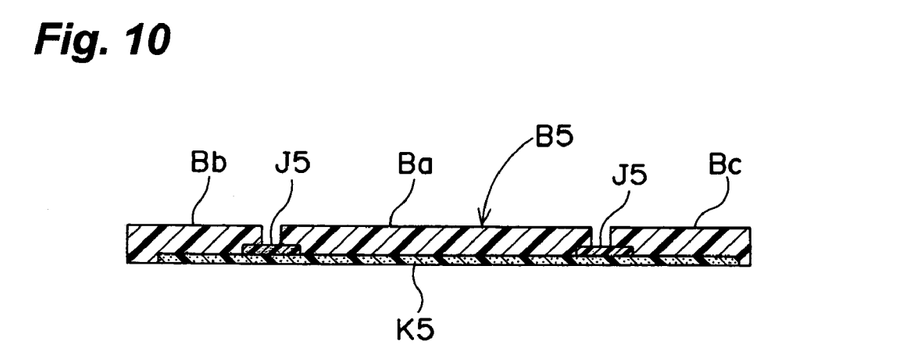
FIG. 10 is a sectional explanatory drawing schematically showing a structure of trunk board in the fifth exemplary embodiment.

The second board parts Bb, Bc and the first board part Ba are rotatably coupled by means of a hinge J5. This hinge J5 is, as shown in FIG. 10, composed of a sound insulating flexible member (for example, sound insulating sheet member of synthetic resin), and is fixed between the first board part Ba and second board parts Bb, Bc without allowing gap. Therefore, sound does not escape from this hinge J5 to be transmitted to the compartment side.

The side of the trunk board B5 facing the trunk floor F5 has a sound absorbing member layer K5, and the sound absorbing effect is enhanced. As the sound absorbing member K5, for example, nonwoven cloth, felt layer, foamed or unfoamed urethane layer, nylon resin carpet layer, and any other sound absorbing materials may be used.

Figure 11:
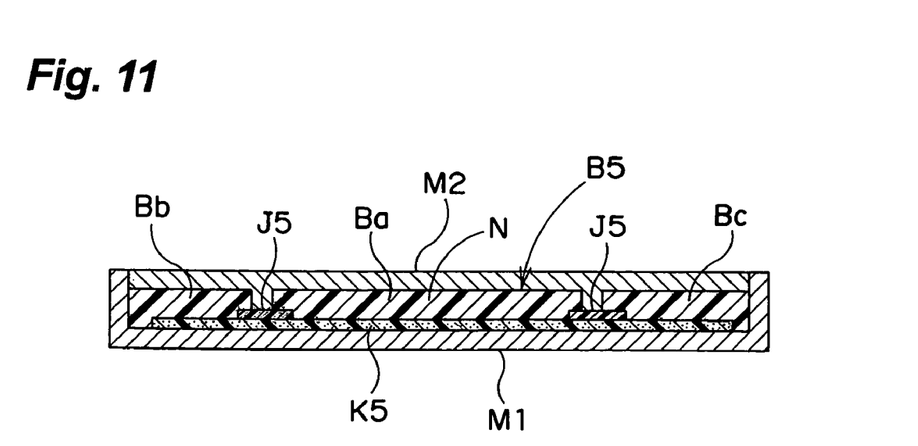
FIG. 11 is a sectional explanatory drawing schematically showing a manufacturing method of trunk board in the fifth exemplary embodiment.

To manufacture such trunk board B5, as shown in FIG. 11, a sound absorbing member K5 is inserted and fixed in a molding die M1, and a flexible sound insulating sheet J5 is inserted and fixed in specified position. By closing with a molding die M2, and the cavity is filled with material resin N5 for molding, thereby producing a trunk board B5 having the sound absorbing member layer K5 at specified one side, with the second board parts Bb, Bc and first board part Ba rotatably coupled by means of the hinge J5.

Thus, the trunk board B5 is divided into the first board part Ba and second board parts Bb, Bc, and the first board part Ba and second board parts Bb, Bc are coupled rotatably by means of the hinge J5. Thereby, it is easier to use the trunk board B5 as compared with a case of a single-piece structure. Moreover, the hinge J5 is made of a sound insulating flexible member, and is fixed without gap between the first board part Ba and second board parts Bb, so that the sound insulating performance of the trunk board B5 is assured.

A sixth exemplary embodiment is described below.

Figure 12:
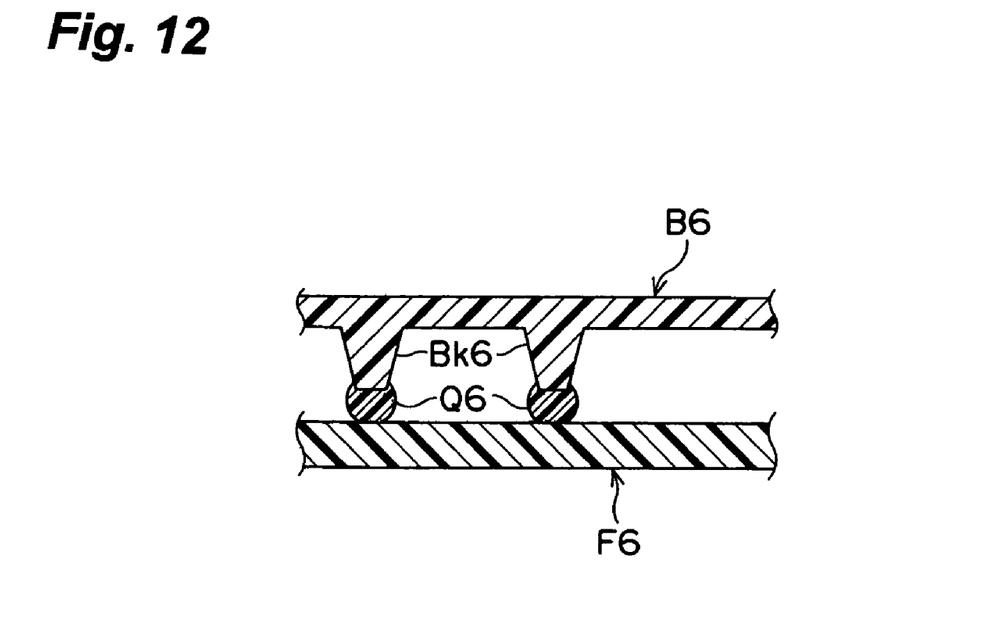
FIG. 12 is a sectional explanatory drawing schematically showing a closed structure of trunk floor and trunk board in a sixth exemplary embodiment.

FIG. 12 is a sectional explanatory drawing schematically showing a closed structure of trunk floor and trunk board in the sixth exemplary embodiment. In the sixth exemplary embodiment, basically, the spare tire storage space and a space of a small volume above it are closed.

In the sixth exemplary embodiment, in at least one of the trunk floor F6 and trunk board B6 (in the trunk board B6 in this exemplary embodiment), an annular protrusion Bk6 projecting to the other side (the trunk floor F6 side) is formed around the space tire storage space (not shown), and a seal member Q6 is provided at the leading end of the protrusion Bk6, and a sealing part is formed.

In this exemplary embodiment, such sealing part is provided in double.

As the material for the seal member Q6, for example, urethane resin or TPO resin may be used, and the seal members Q6 may be integrally formed at the leading end of the protrusion Bk6 by so-called double molding method.

In this case, by forming the protrusion Bk6 and disposing the seal members Q6 at the leading end of the protrusion Bk6 to form the sealing part, the sealing surface pressure is raised in this restraining part, and the closure of the spare tire storage part and the space above it can be further enhanced. Incidentally, the protrusion Bk6 may be formed to project from the trunk floor F6 toward the trunk board B6.

Thus, by forming the sealing part for achieving the tight closure of the spare tire storage space between the trunk floor F6 and trunk board B6, the tight close of the space formed between the trunk floor F6 and trunk board B6 can be achieved, and transmission of sound from the space to the compartment side can be suppressed. That is, by using resin materials for the trunk floor F6, the weight is reduced, and the noise can be controlled by a simple structure.

A seventh exemplary embodiment is described below.

Figure 13:
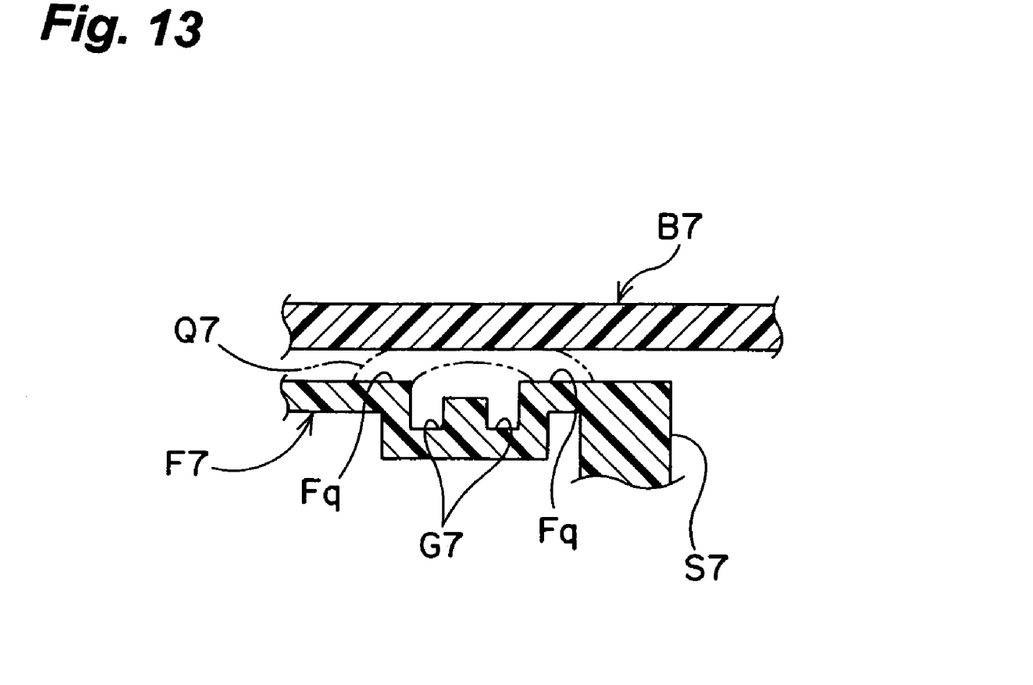
FIG. 13 is a sectional explanatory drawing schematically showing a closed structure of trunk floor and trunk board in a seventh exemplary embodiment.

FIG. 13 is a sectional explanatory drawing schematically showing a closed structure of trunk floor and trunk board in the seventh exemplary embodiment. In the seventh exemplary embodiment, basically, the spare tire storage space is closed.

In the seventh exemplary embodiment, in at least one of the trunk floor F7 and trunk board B7 (in the trunk floor F7 in this exemplary embodiment), an annular groove G7 surrounding the spare tire storage space S7 is formed, and a sealing part is formed by disposing an abutting surface Fq (sealing surface) contacting with an annular seal member Q7 at the outside and inside of the groove G7. As the material for the seal member Q7, for example, rubber may be suitably used.

In this configuration, when fixing the trunk board B7 on the trunk floor F7, the groove G7 is filled with an adhesive, and secure closing and fixing can be achieved. Or, on the other hand, when the trunk board B7 is used as being detachable from the trunk floor F7, the seal member Q7 abuts against the abutting surface Fq (sealing surface), thereby sealing, and the closure between the two B7, F7 can be assured when mounting the trunk board B7. That is, it is applicable to both cases of using the trunk board B7 by fixing or as being detachable.

An eighth exemplary embodiment is described below.

Figure 14:
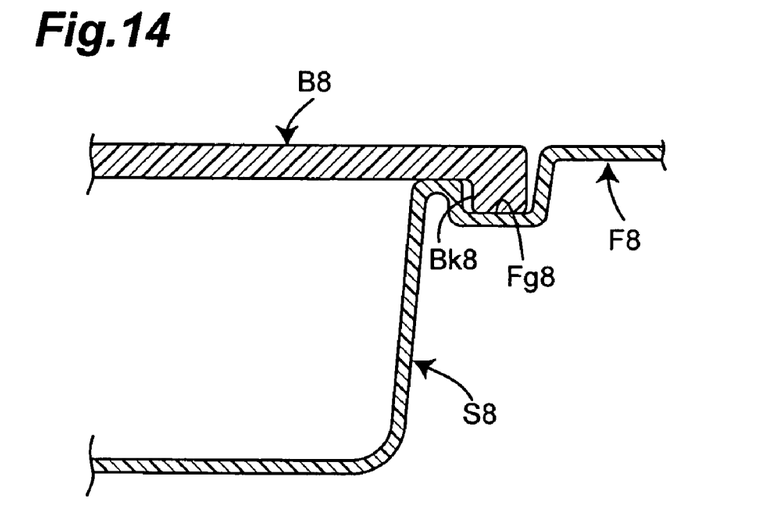
FIG. 14 is a sectional explanatory drawing schematically showing a closed structure of trunk floor and trunk board in an eighth exemplary embodiment.

FIG. 14 is a sectional explanatory drawing schematically showing a closed structure of trunk floor and trunk board in the eighth exemplary embodiment. In the eighth exemplary embodiment, too, a spare tire storage space S8 is closed by a trunk board B8.

In the eighth exemplary embodiment, same as in the third exemplary embodiment, a grooved fitting part Fg8 is formed at the outside of the periphery of the spare tire storage space S8 of the trunk floor F8. On the other hand, the trunk board B8 is set in a size enough to cover above the grooved fitting part Fg8 on the outer circumference, and a convex annular protrusion Bk8 to be combined with the grooved fitting part Fg8 is formed in the lower part of the outer circumference.

This annular protrusion Bk8 is preferably fitted to the grooved fitting part Fg8 by a specified tightening allowance, and hence the closure of the spare tire storage space S8 can be enhanced. Alternately, the fitting structure of the annular protrusion Bk8 and grooved fitting part Fg8 may be a so-called clearance fitting, and an adhesive may be applied between the two.

In the eighth exemplary embodiment, the height of the trunk floor F8 is set so that the upper side of the trunk floor F8 may be nearly flush with the upper side of the trunk board B8 with the annular protrusion Bk8 of the trunk board B8 fitted into the grooved fitting part Fg8 of the trunk floor F8.

In this case, the spare tire storage space S8 can be closed in a very simple structure, and the size of the trunk board B8 can be reduced at the same time.

A ninth exemplary embodiment is described below.

Figure 15:
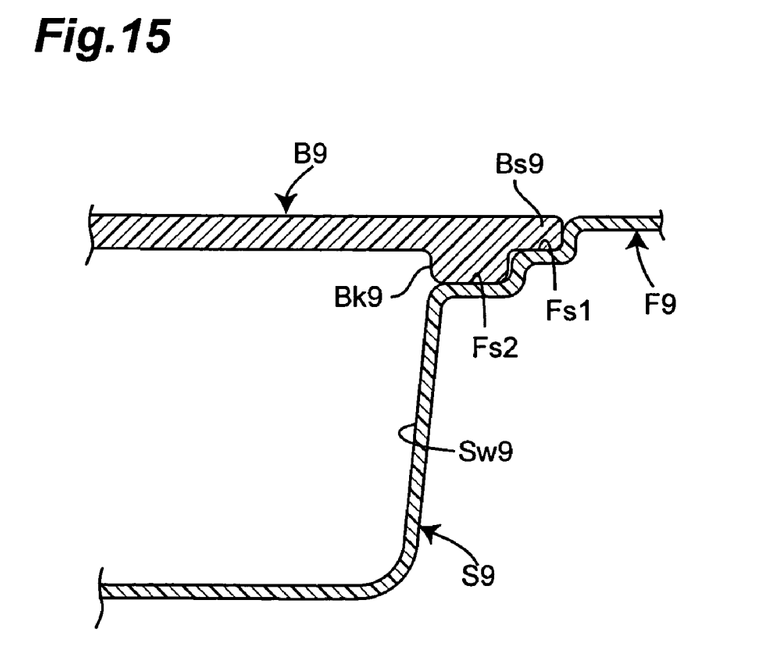
FIG. 15 is a sectional explanatory drawing schematically showing a closed structure of trunk floor and trunk board in a ninth exemplary embodiment.

FIG. 15 is a sectional explanatory drawing schematically showing a closed structure of trunk floor and trunk board in the ninth exemplary embodiment. In the ninth exemplary embodiment, too, a spare tire storage space S9 is closed by a trunk board B9.

In the ninth exemplary embodiment, upper and lower steps Fs1, Fs2 are formed on the peripheral edge of the spare tire storage space S9 of the trunk floor F9. That is, the lower step Fs2 is formed so as to push and spread the upper part of the peripheral wall Sw9 of the spare tire storage space S9 to the outside, and the upper step Fs1 is formed to push and spread an intermediate part of the vertical wall of the lower step Fs2 to the outside.

On the other hand, same as in the eighth embodiment, the trunk board B9 is set in a size enough to cover above the upper step Fs1 on the outer circumference, and a convex annular protrusion Bk9 to be combined with the lower step Fs2 is formed in the lower part near the outer circumference. The trunk board outer circumference Bs9 of the outside of the annular protrusion Bk9 is combined with the upper step Fs1.

At least one of the fitting part of the outer circumference of the annular protrusion Bk9 and the vertical wall of the lower step Fs2 and the fitting part of the outer circumference of the trunk board outer circumference Bs9 and the vertical wall of the upper step Fs1 is preferably fitted by a specified tightening allowance, and hence the closure of the spare tire storage space S9 can be enhanced. Or, instead of this, the fitting structure of the both fitting parts may be a so-called clearance fitting, and an adhesive may be applied between the two.

In the ninth exemplary embodiment, too, the height of the trunk floor F9 is set so that the upper side of the trunk floor F9 may be substantially flush with the upper side of the trunk board B9 with the annular protrusion Bk9 and trunk board outer circumference Bs9 of the trunk board B9 fitted into the lower step Fs2 and upper step Fs1.

In this case, aside from the same function and effect as in the eighth exemplary embodiment, since the fitting part of the trunk board B9 and trunk floor S9 is formed in a double structure, the closure of the spare tire storage space S9 can be further enhanced, and the sound insulating performance is improved.

A tenth exemplary embodiment is described below.

Figure 16:
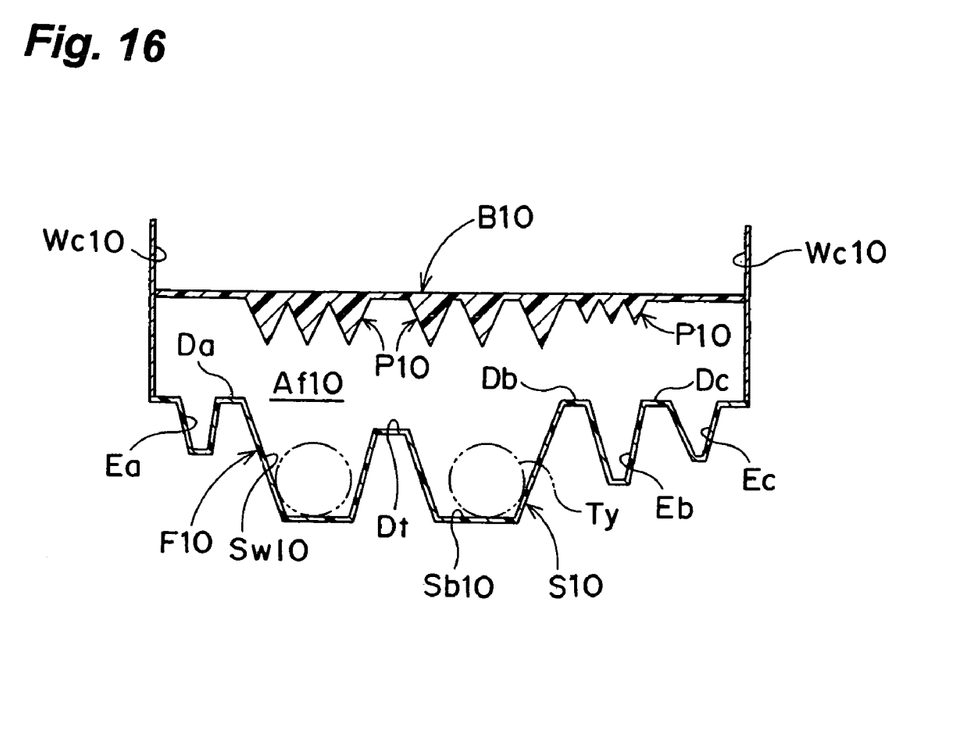
FIG. 16 is a sectional explanatory drawing schematically showing a closed structure of trunk floor and trunk board in a tenth exemplary embodiment.

FIG. 16 is a sectional explanatory drawing schematically showing a closed structure of trunk floor and trunk board in the tenth exemplary embodiment. In the tenth exemplary embodiment, a space Af10 formed between a trunk floor F10 and a trunk board B10 is closed, and noise in this space Af10 is controlled.

In the tenth exemplary embodiment, the trunk floor F10 forms a plurality of commodity storage spaces Ea, Eb, Ec aside from the spare tire storage space S10, and by covering from above by the trunk board B10, the space Af10 formed between the trunk floor F10 and trunk board B10 is closed, including the storage spaces S10, Ea, Eb, Ec of the trunk floor F10.

In this case, too, the same closed structure as in the fourth exemplary embodiment can be applied between the side ends of the trunk board B10 and the car body side wall Wc10.

The peripheral walls off the storage spaces S10, Ea, Eb, Ec are formed in a taper expanding upward, and sound absorbing parts are composed in the inside.

Thus, the multiple commodity storage spaces Ea, Eb, Ec are formed, aside from the spare tire storage space S10, in the trunk floor F10, and the inner sides are formed as sound absorbing parts. Therefore, the area of the sound absorbing parts of the trunk floor F10 is increased, and the sound absorbing performance is enhanced.

In particular, since the peripheral walls of the storage spaces S10, Ea, Eb, Ec are formed in a taper expanding upward, and sound absorbing parts are composed in the inside, as compared with the case of the inner walls of these storage spaces S10, Ea, Eb, Ec formed almost vertically, the area of the sound absorbing parts in the storage spaces S10, Ea, Eb, Ec is further increased and a higher sound absorbing effect is obtained.

By providing such storage spaces S10, Ea, Eb, Ec in the trunk floor F10, the walls Da, Db, Dc formed among the storage spaces S10, Ea, Eb, Ec compose protrusions projecting toward the space Af10. In the bottom Sb10 of the spare tire storage space S10, a tire fixing part Dt is formed for fixing a spare tire Ty, and this tire fixing part Dt also forms a protrusion projecting upward (toward the space Af10).

In other words, by forming these protrusions Da, Db, Dc, Dt, the area of the sound absorbing parts in the trunk floor F10 is further increased and a higher sound absorbing effect is obtained.

Such structure of the trunk floor F10 is same as the trunk floor F5 in the fifth exemplary embodiment. Therefore, in the fifth exemplary embodiment, too, the same function and effect are obtained as for the increase of area of sound absorbing parts of the trunk floor F5 and enhancement of sound absorbing performance.

In this exemplary embodiment, the plurality of storage spaces S10, Ea, Eb, Ec, walls formed among these storage spaces S10, Ea, Eb, Ec, and protrusions Da, Db, Dc, and Dt formed in the tire fixing part are set in mutually different dimensions, in two-dimensional configuration including shape, length and width in a plan view and three-dimensional configuration including depth, height and inclination angle.

This is because if the dimensions are matched, generally, resonance is likely to occur in a specific frequency band, and it is intended to avoid generation of noise by such resonance.

More specifically, by such structure, only by adjusting the molding die when forming the trunk floor F10, resonance of sound in a specific frequency band can be effectively prevented, and by using resin materials for the trunk floor F10, the weight can be reduced and the generation of noise by resonance can be suppressed by a simple structure.

Figure 18A:
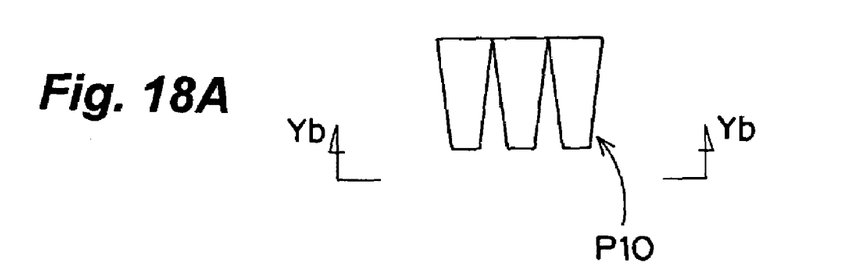
FIG. 18A is an explanatory drawing showing an example of wedge-shaped protrusion.
Figure 18B:
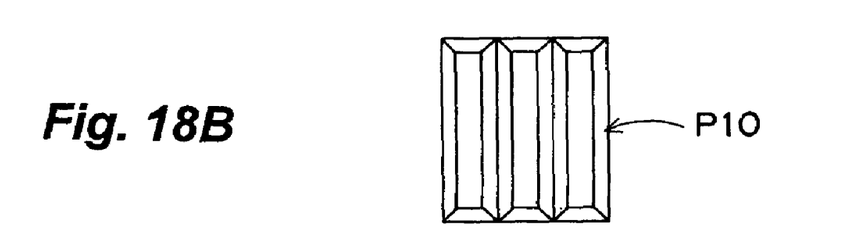
FIG. 18B is an arrow view in Yb—Yb direction in FIG. 18A.
Figure 18C:
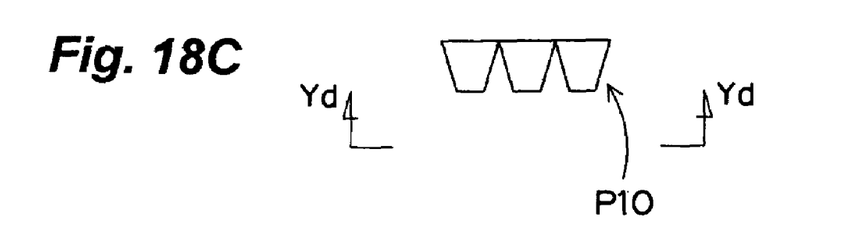
FIG. 18C is an explanatory drawing showing an example of pyramidal protrusion.
Figure 18D:
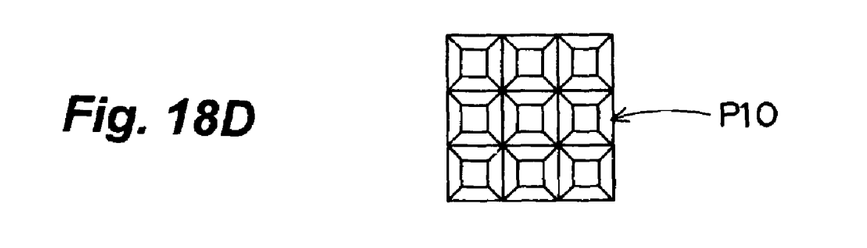
FIG. 18D is an arrow view in Yd—Yd direction in FIG. 18C.

In the trunk board B10, on the other hand, a plurality of protrusions P10 are formed to project into the space Af10 against the trunk floor F10. Such protrusions P10 include the wedge-shaped protrusion as shown in FIGS. 18A and 18B, and pyramidal protrusions as shown in FIGS. 18C and 18D.

In this exemplary embodiment, these plural protrusions P10 are also set in mutually different dimensions (or in every type), in two-dimensional configuration including shape, length and width in a plan view and three-dimensional configuration including height and inclination angle.

Therefore, in this trunk board B10, too, resonance of sound in specific frequency band can be prevented effectively.

As for each protrusion P10 of the trunk board B10, by forming sound absorbing parts on the surface, the area of sound absorbing parts of the trunk board B10 is increased, and the sound absorbing effect is enhanced.

In the exemplary embodiment, by forming multiple protrusions P10 on the trunk board B10 and also forming multiple protrusions Da, Db, Dc and Dt on the trunk floor F10, multiple concavities and convexities are formed on each surface, thereby the sound attenuating effect can be obtained respectively.

In this case, noise in each specific frequency band can be effectively attenuated by determining the frequency band of the object of attenuation, and setting the dimensions and shapes of the multiple protrusions P10 and protrusions Da, Db, Dc, Dc, depending on such frequency band, respectively for the trunk board B10 and trunk floor F10.

Further, in the exemplary embodiment, the dimensions of the plural protrusions P10 of the trunk board B10 are set considerably smaller than the dimensions of the plural protrusions Da, Db, Dc, Dt of the trunk floor F10.

Figure 17:
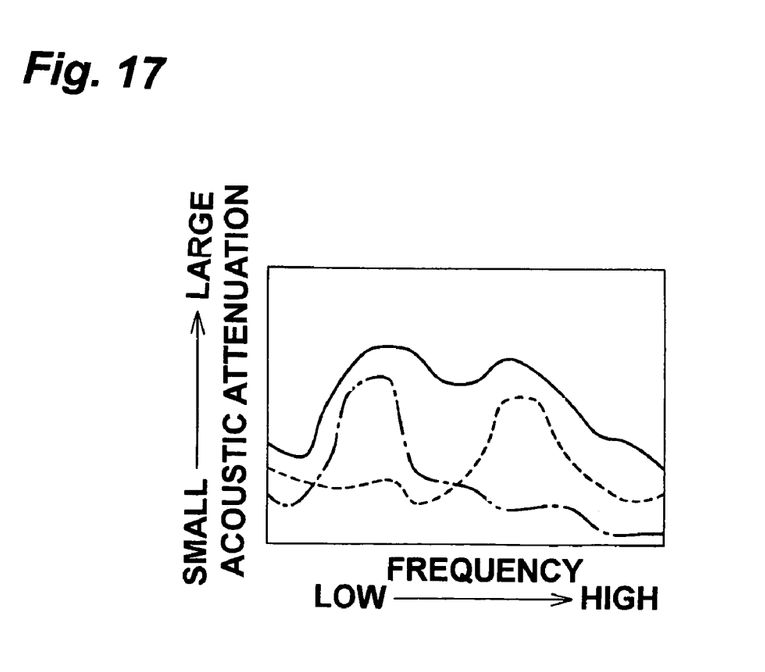
FIG. 17 is a graph showing an example of relation of sound frequency and acoustic attenuation.

That is, the plural protrusions P10 of the trunk board B10 are set in the dimensions and shape depending on the relatively high frequency band of the object of attenuation, aiming at the object of attenuation of relatively high frequency band, as shown by broken-line curve in the graph of FIG. 17.

On the other hand, the plurality of protrusions Da, Db, Dc, Dt of the trunk floor F10 are set in the dimensions and shape depending on the relatively low frequency band of the object of attenuation, aiming at the object of attenuation of relatively low frequency band, as shown by single dot chain line curve in the graph of FIG. 17.

Therefore, by the plurality of protrusions P10 of the trunk board B10, noise in relatively high frequency band can be attenuated, and by the plurality of protrusions Da, Db, Dc, Dt of the trunk floor F10, noise in relatively low frequency band of the object of attenuation can be attenuated. That is, as indicated by solid line curve in the graph in FIG. 17, together with the trunk board B10 side and floor panel F10 side, noise in a wider frequency band can be effectively attenuated.

The invention is not limited to the illustrated preferred embodiments alone, but may be changed or modified in the design within a scope not departing from its true spirit.

What is claimed is:

1. A resin-made floor panel structure applied in a vehicle floor comprising:
    a floor panel made of resin integrally forming a circular spare tire storage space, and a trunk board made of resin disposed so as to cover the floor panel,
    wherein fitting parts are integrally formed in the floor panel and trunk board respectively so as to achieve the closure of the circular spare tire storage space, a peripheral wall of the circular spare tire storage space including an upwardly expanding tapered fitting part about an entire circumference of the peripheral wall, and the fitting part of the trunk board has a taper to be engaged with the tapered fitting part.

2. The resin-made floor panel structure of claim 1, wherein the trunk board has an engaging part for achieving air tightness against the car body side wall.

3. The resin-made floor panel structure of claim 2, wherein the trunk board includes a first board part covering the circular spare tire storage space, a second board part having the engaging part and covering the portion excluding the circular spare tire storage space of the floor panel, and a hinge part rotatably coupling the second board part and first board part, and
    the hinge part is composed of a sound insulating flexible member, and is fixed between the both board parts without allowing gap.

4. The resin-made floor panel structure of claim 1, wherein a concave commodity pocket formed along the taper of the fitting part is provided at the upper side of the fitting part of the trunk board.

5. The resin-made floor panel structure of claim 1, wherein a grooved fitting part is formed at the outer side of the peripheral edge of the spare tire storage part, and the fitting part of the trunk board is formed in a convex shape to be combined with the grooved fitting part.

* * * * *